US009369294B2

(12) United States Patent  
Morin

(10) Patent No.: US 9,369,294 B2  
(45) Date of Patent: Jun. 14, 2016

(54) REVERSE 911 USING MULTICAST SESSION INTERNET PROTOCOL (SIP) CONFERENCING OF VOICE OVER INTERNET PROTOCOL (VOIP) USERS

(75) Inventor: Drew Morin, Davidsonville, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 986 days.

(21) Appl. No.: 12/292,719

(22) Filed: Nov. 25, 2008

(65) Prior Publication Data

US 2009/0154659 A1   Jun. 18, 2009

Related U.S. Application Data

(60) Provisional application No. 61/006,014, filed on Dec. 14, 2007.

(51) Int. Cl.  
*H04L 12/18* (2006.01)  
*H04L 29/06* (2006.01)  
*H04M 11/04* (2006.01)

(52) U.S. Cl.  
CPC ........ *H04L 12/1818* (2013.01); *H04L 65/1006* (2013.01); *H04L 65/1069* (2013.01); *H04L 65/403* (2013.01); *H04L 65/1096* (2013.01); *H04M 11/04* (2013.01)

(58) Field of Classification Search  
CPC ... H04L 65/403; H04L 65/1006; H04L 12/18; H04L 12/1822; H04M 3/567; H04M 11/04  
USPC ........................ 455/404.1; 379/39–44, 48, 51  
See application file for complete search history.

(56) References Cited

U.S. PATENT DOCUMENTS

| | | | |
|---|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Droro et al. |
| 5,119,104 A | 6/1992 | Heller |

(Continued)

OTHER PUBLICATIONS

Kim, J. Y., et al., "An Enhanced VoIP Emergency Services Prototype," Proceedings of the 3rd International ISCRAM Conference, Newark, N J, May 2006.*

(Continued)

*Primary Examiner* — Nam Huynh  
(74) *Attorney, Agent, or Firm* — Tarolli, Sundheim, Covell & Tummino LLP

(57) ABSTRACT

A reverse 911 system uses voice over Internet Protocol (VoIP)/Session Internet Protocol (SIP) conferencing. An emergency alert message may be a text, video, MMS, hyperlink and/or image communicated simultaneously to multiple VoIP users via a SIP conference. Multiple SIP conferences may be cascaded to communicate with a larger number of users in a relevant group of users to be communicated with.

24 Claims, 4 Drawing Sheets

(56) References Cited

U.S. PATENT DOCUMENTS

| | | |
|---|---|---|
| 5,144,283 A | 9/1992 | Arens et al. |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moodey et al. |
| 5,266,944 A | 11/1993 | Carrol et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,590,417 A | 12/1996 | Rydbeck |
| 5,592,535 A | 1/1997 | Klotz |
| 5,604,486 A | 2/1997 | Lauro |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,694,546 A | 12/1997 | Reisman |
| 5,724,667 A | 3/1998 | Furuno |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vantila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,825,283 A | 10/1998 | Camhil |
| 5,828,740 A | 10/1998 | Khuc et al. |
| 5,867,495 A | 2/1999 | Elliott et al. |
| 5,905,736 A | 5/1999 | Ronen et al. |
| 5,920,821 A | 7/1999 | Seaholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,949,326 A | 9/1999 | Wicks et al. |
| 5,950,130 A | 9/1999 | Coursey |
| 5,953,398 A | 9/1999 | Hill |
| 5,960,074 A | 9/1999 | Clarke |
| 5,966,663 A | 10/1999 | Gleason |
| 5,973,724 A * | 10/1999 | Riddle .................. 348/14.07 |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,078,583 A | 6/2000 | Takahara |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,178,331 B1 | 1/2001 | Holmes et al. |
| 6,181,935 B1 | 1/2001 | Gossman et al. |
| 6,185,602 B1 | 2/2001 | Bayrakeri |
| 6,188,752 B1 | 2/2001 | Lesley |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,223,046 B1 | 4/2001 | Hamill-Keays et al. |
| 6,226,529 B1 | 5/2001 | Bruno et al. |
| 6,249,680 B1 | 6/2001 | Wax et al. |
| 6,249,744 B1 | 6/2001 | Morita |
| 6,266,614 B1 | 7/2001 | Alumbaugh |
| 6,289,373 B1 | 9/2001 | Dezonno |
| 6,314,108 B1 | 11/2001 | Ramasubramani et al. |
| 6,317,594 B1 | 11/2001 | Gossman et al. |
| 6,327,479 B1 | 12/2001 | Mikkola |
| 6,353,614 B1 | 3/2002 | Borella et al. |
| 6,373,930 B1 | 4/2002 | McConnell et al. |
| 6,393,461 B1 | 5/2002 | Okada et al. |
| 6,396,913 B1 | 5/2002 | Perkins, III |
| 6,459,892 B2 | 10/2002 | Burgan et al. |
| 6,499,053 B1 | 12/2002 | Marquette et al. |
| 6,526,335 B1 | 2/2003 | Treyz |
| 6,564,261 B1 | 5/2003 | Gudjonsson et al. |
| 6,677,894 B2 | 1/2004 | Sheynblat |
| 6,690,940 B1 | 2/2004 | Brown |
| 6,842,449 B2 | 1/2005 | Hardjono |
| 6,868,074 B1 | 3/2005 | Hanson |
| 6,970,871 B1 | 11/2005 | Rayburn |
| 6,993,325 B1 | 1/2006 | Waesterlid |
| 7,020,480 B2 | 3/2006 | Coskun |
| 7,054,659 B2 | 5/2006 | Gioscia |
| 7,123,874 B1 | 10/2006 | Brennan |

(56) References Cited

U.S. PATENT DOCUMENTS

| | | |
|---|---|---|
| 7,130,383 B2 | 10/2006 | Naidoo |
| 7,180,415 B2 | 2/2007 | Banker |
| 7,245,216 B2 | 7/2007 | Burkley |
| 7,317,705 B2 | 1/2008 | Hanson |
| D562,808 S | 2/2008 | Gwee |
| 7,444,342 B1 | 10/2008 | Hall et al. |
| 7,522,182 B2 | 4/2009 | Bang |
| 7,603,148 B2 | 10/2009 | Michalak |
| 7,693,546 B1 | 4/2010 | Gioscia |
| 7,925,246 B2 * | 4/2011 | McKibben et al. ............ 455/416 |
| 8,200,291 B2 | 6/2012 | Steinmetz |
| 8,265,326 B2 | 9/2012 | Singh |
| 8,284,980 B2 | 10/2012 | Parker |
| 2002/0155844 A1 | 10/2002 | Rankin |
| 2003/0060214 A1 | 3/2003 | Hendrey |
| 2003/0157942 A1 | 8/2003 | Osmo |
| 2003/0169881 A1 | 9/2003 | Niedermeyer |
| 2003/0186709 A1 | 10/2003 | Rhodes |
| 2003/0220835 A1 | 11/2003 | Barnes, Jr. |
| 2004/0077359 A1 | 4/2004 | Bernas |
| 2004/0137921 A1 | 7/2004 | Valloppillil et al. |
| 2004/0176123 A1 | 9/2004 | Chin |
| 2004/0198386 A1 | 10/2004 | Dupray |
| 2004/0198389 A1 | 10/2004 | Alcock |
| 2004/0203863 A1 | 10/2004 | Huomo |
| 2004/0203900 A1 | 10/2004 | Cedervall |
| 2004/0209594 A1 | 10/2004 | Naboulsi |
| 2005/0071671 A1 | 3/2005 | Karaoguz |
| 2005/0079877 A1 | 4/2005 | Ichimura |
| 2005/0149430 A1 | 7/2005 | Williams |
| 2005/0197775 A1 | 9/2005 | Smith |
| 2005/0277432 A1 | 12/2005 | Viana |
| 2005/0282518 A1 | 12/2005 | D'Evelyn |
| 2006/0003775 A1 | 1/2006 | Bull |
| 2006/0058102 A1 | 3/2006 | Nguyen |
| 2006/0109960 A1 | 5/2006 | D'Evelyn |
| 2006/0116138 A1 | 6/2006 | Simsek |
| 2006/0142027 A1 | 6/2006 | Krishnamurthi et al. |
| 2006/0183460 A1 | 8/2006 | Srinivasan |
| 2006/0233317 A1 * | 10/2006 | Coster et al. ................... 379/45 |
| 2007/0004424 A1 | 1/2007 | Sheen |
| 2007/0021098 A1 | 1/2007 | Rhodes |
| 2007/0092070 A1 * | 4/2007 | Croy et al. ..................... 379/45 |
| 2007/0117574 A1 | 5/2007 | Watanabe |
| 2007/0117577 A1 | 5/2007 | Harris |
| 2007/0149208 A1 | 6/2007 | Syrbe |
| 2008/0014964 A1 | 1/2008 | Sudit |
| 2008/0069011 A1 * | 3/2008 | Sekaran et al. ................ 370/260 |
| 2008/0069310 A1 * | 3/2008 | Berstis et al. ................ 379/67.1 |
| 2008/0101339 A1 * | 5/2008 | Forbes et al. ................ 370/352 |
| 2008/0253535 A1 | 10/2008 | Sherry |
| 2008/0268769 A1 | 10/2008 | Brown |
| 2009/0029675 A1 | 1/2009 | Steinmetz |
| 2009/0221263 A1 | 9/2009 | Titus |
| 2010/0076767 A1 | 3/2010 | Vieri |
| 2010/0167691 A1 | 7/2010 | Howarter |
| 2011/1094468 | 5/2011 | Hirschfeld |

OTHER PUBLICATIONS

Mintz-Habib et al., Department of Computer Science, Columbia University, 2005.*

47 code of federal regulations (Oct. 1, 2005 Edition).

PCT Search Report issued in PCT/US008/13690 and mailed on Jan. 29, 2009.

* cited by examiner

REVERSE 911 USING MULTICAST SESSION INTERNET PROTOCOL (SIP) CONFERENCING OF VOICE OVER INTERNET PROTOCOL (VOIP) USERS

The present invention claims priority from U.S. Provisional Application No. 61/006,014, entitled "MULTICAST SESSION INTERNET PROTOCOL (SIP) FOR VOICE OVER INTERNET PROTOCOL (VoIP) REVERSE 911" to Drew Morin, filed on Dec. 14, 2007, the entirety of which is expressly incorporated herein by reference.

BACKGROUND OF THE INVENTION

1. Field of the Invention

This invention relates generally to IP based communications for emergency 911 services. More particularly, it relates to emergency alert (e.g., Emergency Alert™ type services) and technology for land-based and/or wireless phones, including and particularly Voice Over Internet Protocol (VoIP) phones.

2. Background of Related Art

Many communities have, or are in the process of, implementing what is known as an emergency alert system. An emergency alert system allows an emergency center to rapidly notify by telephone residents and businesses within a given geographical area affected by any given emergency. The larger the emergency, the larger the affected community and number of telephones to be notified. Public safety access points (PSAPs) typically employ emergency alert in emergency situations where it is necessary to contact thousands of citizens to alert them of pending or potential dangers, such as neighborhood evacuations, tornado warnings, etc.

FIG. 4 shows a conventional emergency alert system for implementing reverse 911.

In particular, the conventional emergency alert system 400 for implementing reverse 911 includes a dialing controller 420, a phone number database 410, a modem bank 430, and a plurality of users 440. Generally speaking, as shown in FIG. 4, there are a given number of phone numbers 1 through Z to be called using a smaller number N of modems in the modem bank 430.

Current emergency alert systems 400 employ banks of telephone dialers (e.g., modem bank 430 for dialing out) to quickly work through a list of hundreds, and even thousands (or more) of telephone numbers associated with users 440, playing an audio recording to each answered phone. Some emergency alert systems 400 will leave an emergency message on an answering machine if that is what answers the line. Emergency alert systems 400 will keep track of which telephone numbers in a list from phone number database 410 that are not answered after a predetermined number of rings, and will attempt to redial those phone numbers a predetermined number of times in an attempt to make contact with a user 440.

Currently, banks of outdialing "phones", i.e., modem bank 430, are used to implement reverse 911. This type of service is used to notify people in a local area of an emergency event such as a Tornado, chemical spill, terrorist attack, etc. The bank of phones from modem bank 430 dial specific phone numbers, play a prerecorded message, disconnect and then dial the next number in a sequence of provisioned numbers meeting a specific criteria from phone number database 410.

But the present inventor has appreciated that the current approach to reverse 911 relying on such an emergency alert system 400 may be slow to complete if an exceedingly large number of phones must be called through a proportionately small number of modems since each phone, associated with respective users 440, is individually dialed and the complete transaction must be executed before moving on to the next number. The number of simultaneous calls that can be completed is limited to the number of modems because each executes a single phone call at a time.

There is a need for a better emergency alert system capable of quickly and reliably alerting phones currently within a region affected by a given emergency message.

SUMMARY OF THE INVENTION

In accordance with the principles of the present invention, a reverse 911 emergency alert system comprises a conference server triggered by an appropriate event. A Session Internet Protocol (SIP) conferencer, initiated by the conference server, establishes an initial SIP conference between a source of an emergency message and a plurality of user agents. A source generates an emergency message that is transmitted into the SIP conference.

A method of providing a reverse 911 service in accordance with another aspect of the invention comprises receiving a trigger for issuing an emergency alert. A first Session Internet Protocol (SIP) conference call is established between a source of an emergency message and a plurality of user agents selected to receive the emergency message. The emergency message is issued to the plurality of user agents.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present invention provides reverse 911 using voice over Internet Protocol (VoIP)/Session Internet Protocol (SIP) conferencing. The disclosed embodiments include a method and apparatus for enabling a single source to communicate simultaneously to multiple recipients or subscribers using a limited broadcast (SIP multicast) capability for the purpose of group notification for a potentially large number of subscribers.

The invention takes advantage of Voice over IP technology to establish a conference call across multiple phone numbers simultaneously. The SIP conference bridge is used to "push" a SIP invite to SIP conference bridge participants that rings their phones, and connects multiple users at once in a conference call that plays the announcement simultaneously to those in the conference.

Thus, reverse 911 is implemented for use in a VoIP phone network. Many reverse 911 situations require notification to those subscribers that are currently located within a given geographic area. In such an implementation, the entity that knows the location of any given VoIP phone is the VoIP positioning center (VPC). However, in the case of a completely wireless phone (e.g., cellular, WiFi), there may not be any network entity that knows the current location of a mobile user.

Reverse 911 requires the communication of time critical information to a potentially large quantity of subscribers. Voice over Internet Protocol (VoIP) enables a different paradigm for communications that abstracts from the analog systems based telecommunications architecture of the past to enable voice or other historically analog sessions to be encapsulated into digital data sessions and transported over the Internet in a much more efficient manner.

This invention applies concepts developed in support of conference call establishment under the SIP in an innovative way to address the specific needs of Reverse 911 in a manner that improves the speed of the service, broadens the information available, and expands services beyond its current capabilities while reducing the total cost to implement.

Figure 1:
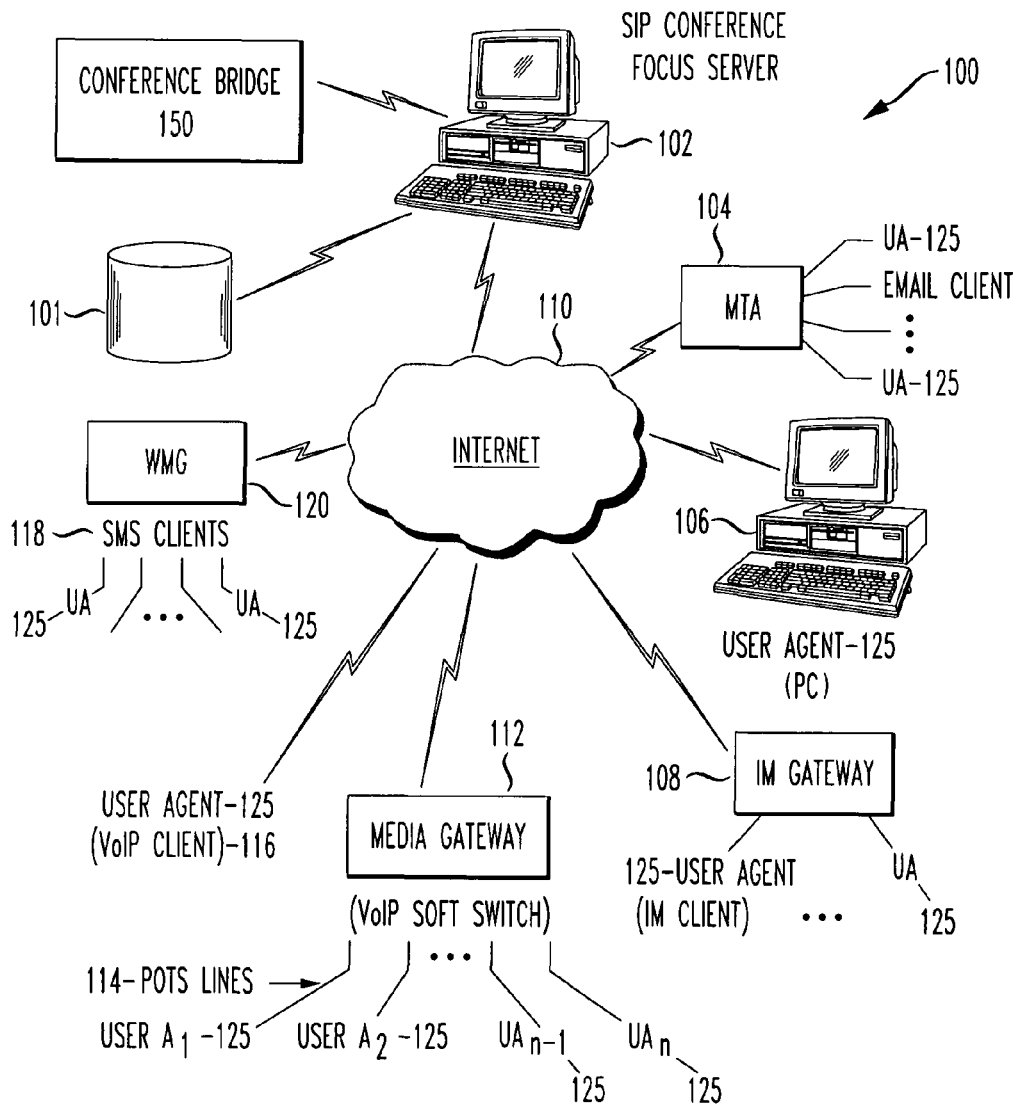
FIG. 1 shows an exemplary reverse 911 system using a SIP conference, in accordance with the principles of the present invention.

FIG. 1 shows an exemplary reverse 911 system using a SIP conference, in accordance with the principles of the present invention.

In particular, the reverse 911 system 100 includes a SIP conference focus server 102 that can access a user agent database 101, various user agents 125, an IP communication medium 110 such as the Internet, a message transfer agent (MTA) 104, a personal computer 106, an instant messaging (IM) gateway 108, a media gateway 112, and a wireless messaging gateway (WMG) 120.

Any appropriate event may be used to trigger a reverse 911 message transmission, e.g., a public emergency such as a natural disaster or terrorist attack. In the event of a reverse 911 trigger event, the SIP conference focus server 102 establishes a conference bridge, i.e., a SIP conference bridge 150 for conducting a reverse 911 conference call with a plurality of recipients simultaneously. The SIP conference bridge 150 allows a plurality of VoIP user agents 125 to simultaneously connect to an established conference, allowing the user agents 125 to simultaneously receive an emergency message.

While not a requirement, the SIP conference is preferably a listen-only conference for all user agents, with the exception of the source of the reverse 911 emergency information which can be delivered in many different forms (e.g., voice message, text, video, etc.).

The SIP conference focus server 102 invites user agents 125 that are accessible through an IP communication medium 110, such as a VoIP client 116 and a personal computer 106. The SIP conference focus server 102 also invites user agents 125 that are accessible through various intermediary devices, such as an MTA 104, an IM gateway 108, a media gateway 112, and a WMG 120.

The media gateway 112 performs Voice Over Internet Protocol (VoIP) soft-switching to allow VoIP access to user agents 125 with an analog telephone device connected to plain old telephone server (POTS) lines 114.

The SIP conference focus server 102 retrieves a list of user agents 125 from a user agent database 101. The SIP conference focus server 102 uses subscriber lists to identify and contact applicable user agents 125.

The subscriber list can be either static or dynamic. A subscriber list is static if it is based upon opt-in, call lists, defined community (enterprise), etc. A subscriber list is dynamic if it is based on some changeable set of criteria such as geographic proximity, group membership, common likes/dislikes, health vulnerabilities (asthmatics), etc.

Similarly, the user agent database 101 may include either a static user agent list, a dynamic user agent list or a combination of both. A dynamic user agent is preferably a list of phone numbers that are provisioned at the time of the event, making the provisioning process very quick without the need to rely on a static list that must be updated periodically, though a static user agent list is possible. But a dynamic user agent list comprises a data set that can be generated in real time based on a specific event and best data available.

The SIP conference focus server 102 establishes a SIP conference bridge 150 for a conference call preferably based on the capabilities of particular user agents 125. The capabilities of the particular user agents 125 can be stored in an appropriate user agent database 101 and retrieved by the SIP conference focus server 102.

As an example of a user capability that can be used to group a number of users in a user agent list, the SIP conference focus server 102 may establish a video conference call with user agents 125 that are capable of, or otherwise support, video messaging. Another example, with respect to voice messaging, the SIP conference focus server 102 may establish a voice conference call with user agents 125 that support voice messaging.

Mixed mode conferencing may also be implemented such that the SIP conference focus server 102 establishes a SIP conference call transmitting in a common mode with user agents that support the common mode within the various platforms. For instance, the SIP conference focus server 102 may be provisioned to form a SIP conference to broadcast a voice emergency message to user agents capable of voice only as well as user agents capable of video (using only the audio channel). In this way a reverse 911 emergency alert may be employed across several types of formats that support such alert. Thus, a text message that can be received by user agents 125 of various platforms may be transmitted to user agents in a common SIP conference.

Alternately, the SIP conference focus server 102 can establish a conference bridge 150 for a SIP conference call irrespective of the capabilities of particular user agents 125. In such case, the SIP conference focus server 102 can issue a plurality of emergency messages in a plurality of formats, with the user agents 125 receiving whatever emergency message they have the capability to receive based on the particular capabilities of an end device employed by user agents 125.

The definition of a user agent as referred to herein includes any SIP enabled device (either directly or via a format conversion entity) that can be engaged in a SIP conference. The user agents 125 associated with an end device include addressable devices beyond merely analog devices to include VoIP devices, PCs, Email and SMS clients (through gateways), IM clients, and other IP addressable devices.

A user agent 125 may be implemented in any electronic device capable of receiving an emergency message having an appropriate format, e.g., a pager, a cellular telephone, a portable computer, a desktop computer, a personal data assistant (PDA), a VoIP phone, etc.

The types of reverse 911 messages that can be sent to a particular user agent 125 is limited only by the capabilities of the particular receiving device running any given user agent 125. For example, a pager can receive a text alert message, but may not be capable of receiving a video alert message. Likewise, a cellular telephone may lack the capability to receive a video alert message, but may have the capability to receive a text alert message and/or the ability to receive a voice message.

A user agent 125 may be implemented in an automobile that is equipped with a networked navigation or other addressable communications system. In this way drivers may be alerted to emergency situations appropriate to them, e.g., an amber alert, a warning to clear the roadway because of a high speed chase in progress, etc. Further, this user agent 125 could act autonomously on the information received from the conference. In this case, the user agent 125 implemented within a networked navigation system might automatically take appropriate action in response to an emergency alert, e.g., to reroute the driver.

Similarly, an Internet connected device (such as a personal computer or internet TV) might take the direct action on receipt of an emergency message to display additional information from an emergency responder web site. The user agent 125 may also be implemented within the First Responder community such that receipt of the reverse 911 message could trigger map downloads or the execution of automated emergency response procedures, The SIP conference focus server 102 is itself a member in the conference established to transmit an emergency message, so the SIP conference focus server 102 itself includes a user agent 125, but in its case is preferably capable of initiating and hosting a SIP conference.

Because the SIP conference focus server 102 is able to participate and host a SIP conference, it preferably allows for cascaded conferencing, i.e., repeated establishment of subsequent SIP conferences, communicating an emergency alert message to a given group of user agents, breaking down the SIP conference, starting a subsequent SIP conference of another group of user agents, communicating the same emergency alert message (in a same or different format), etc. Subsequent SIP conferences may be cascaded one after another until a total list of user agents to be communicated with have had the emergency message transmitted to them (or attempted to be transmitted to them). In this way reverse 911 is extended to a broad set of users and devices in a short time.

The disclosed SIP conference focus server 102 is preferably capable of initiating multicast. Multicast is a protocol definition within the Internet Protocol (IP) that defines a limited scope broadcast requiring participants to join a particular group in order to participate.

An out calling mechanism, in accordance with the principles disclosed herein, includes a SIP conference call with direct INVITE, a multicast conference call, and a cascading conference call. In operation, the SIP conference focus server 102 issues an INVITE to user agents 125 designated in a user agent list formulated dynamically from user agent database 101 or retrieved from user agent database 101.

Preferably the SIP conference call established by a SIP conference focus server 102 in accordance with the principles disclosed herein allows provision of additional emergency information to those user agents capable of receiving such additional information. For instance, the emergency alert information includes not only a message such as "An armed robber is loose in your neighborhood-lock your doors!", but it may also provide other suitable information of any appropriate type. For example, an emergency alert voice message may be followed by, or included with, an image of a suspect, most wanted person, or person of interest; a map indicating a place where a robbery or other recent crime occurred; a map of recommended evacuation routes; etc. Alternatively, a hypertext link may be included with a reverse 911 emergency text message hyperlinking an Internet user to a web page hosting additional information with respect to the current emergency alert message.

Figure 2:
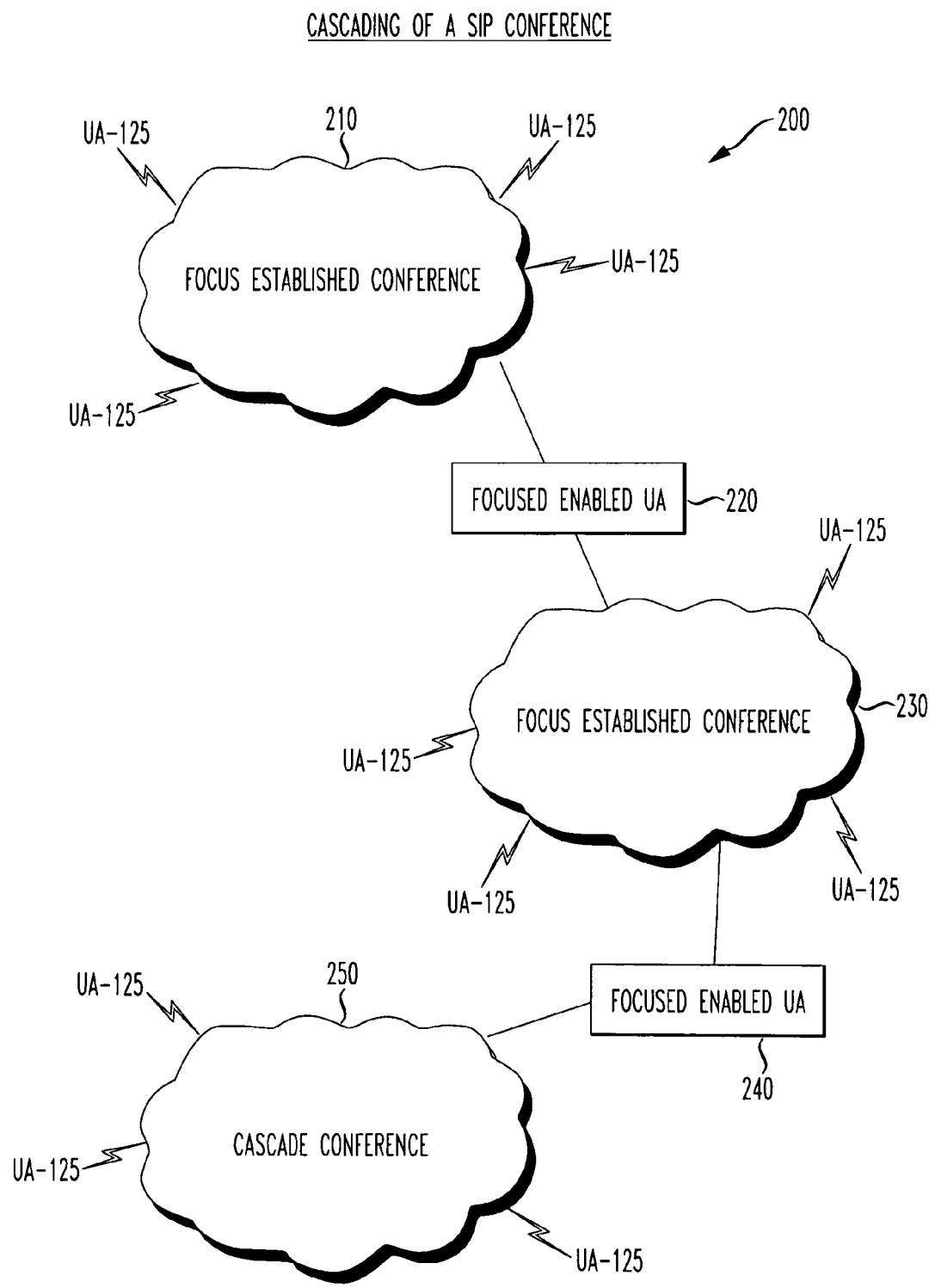
FIG. 2 shows a cascade of SIP conferences for implementing reverse 911 services, in accordance with the principles of the present invention.

FIG. 2 shows a cascade of SIP conferences for implementing reverse 911 services using an IP solution to reverse 911, in accordance with the principles of the present invention.

In particular, as shown in FIG. 2, the invention makes it possible to "cascade" a SIP conference bridge capability to connect potentially all of the user agents 125 at the same time, enabling a single, direct and live communication with all relevant users.

In particular, a cascade of SIP conferences 200 for implementing reverse 911 services can include a focus server-established conference 210, focus-enabled user agents 220 and 240, a cascade conference 230, a cascade conference 250, and various user agents 125.

As discussed above, a user agent as described herein includes any SIP enabled device that can be engaged in a SIP conference. However, in accordance with the principles disclosed herein, at least some of the user agents 125 can further include the ability to act as a conference focus server 102 themselves. A first focus enabled user agent 220 and a second focus enabled user agent 240 are two such exemplary specialized user agents 125 that have the additional ability to act as a SIP conference focus server 102.

In the event of a trigger event triggering a reverse 911 emergency message, an initial focus-established conference 210 is established by the SIP conference focus server 102. The various relevant user agents 125 to be included in the reverse 911 communication are determined from a suitable database, and are invited to participate in the initially established SIP conference.

In accordance with the principles disclosed herein, the focus enabled user agent 220 that is invited to participate in the initial focus-established conference 210 not only participates in the focus-established conference 210 but also establishes its own cascade conference 230.

Likewise, as discussed above, the focus enabled user agent 240 that is invited to participate in the established cascade conference 230 not only participates in the cascade conference 230 but also establishes its own cascade conference 250.

Parameters for establishing additional conferences can be passed to the focus enabled user agent 220 and the focus enabled user agent 240 from the SIP conference focus server 102 establishing the initial focus-established conference 210. Alternately, parameters for establishing additional conferences can be retrieved by the focus enabled user agent 220 and the focus enabled user agent 240 from the SIP conference focus server 102 that initiated the focus-established conference 210. A request can be transmitted from the focus enabled user agents 220, 240 to the SIP conference focus server 102 to retrieve any necessary parameters for establishing a conference.

Figure 3:
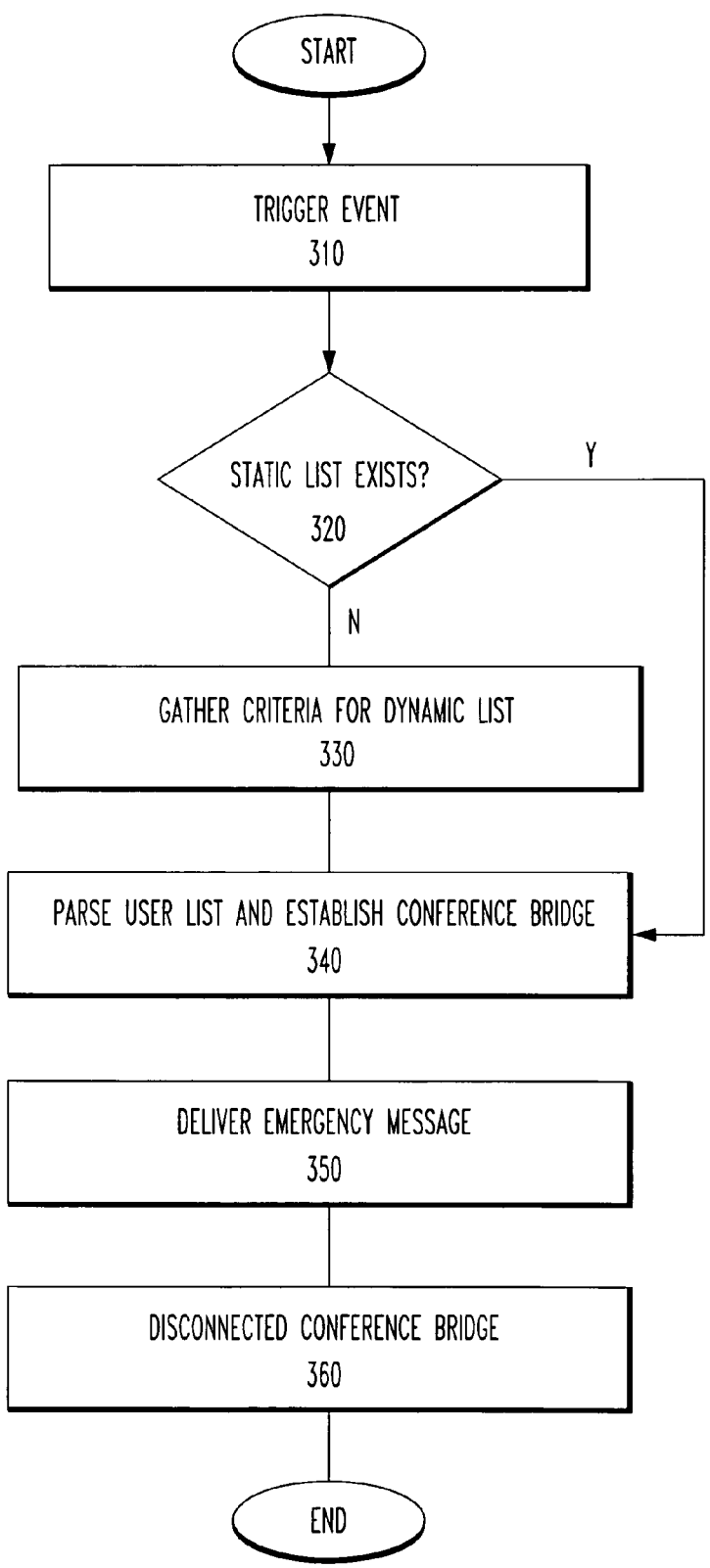
FIG. 3 shows a process for initiating a SIP conference based emergency call, in accordance with the principles of the present invention.
Figure 4:
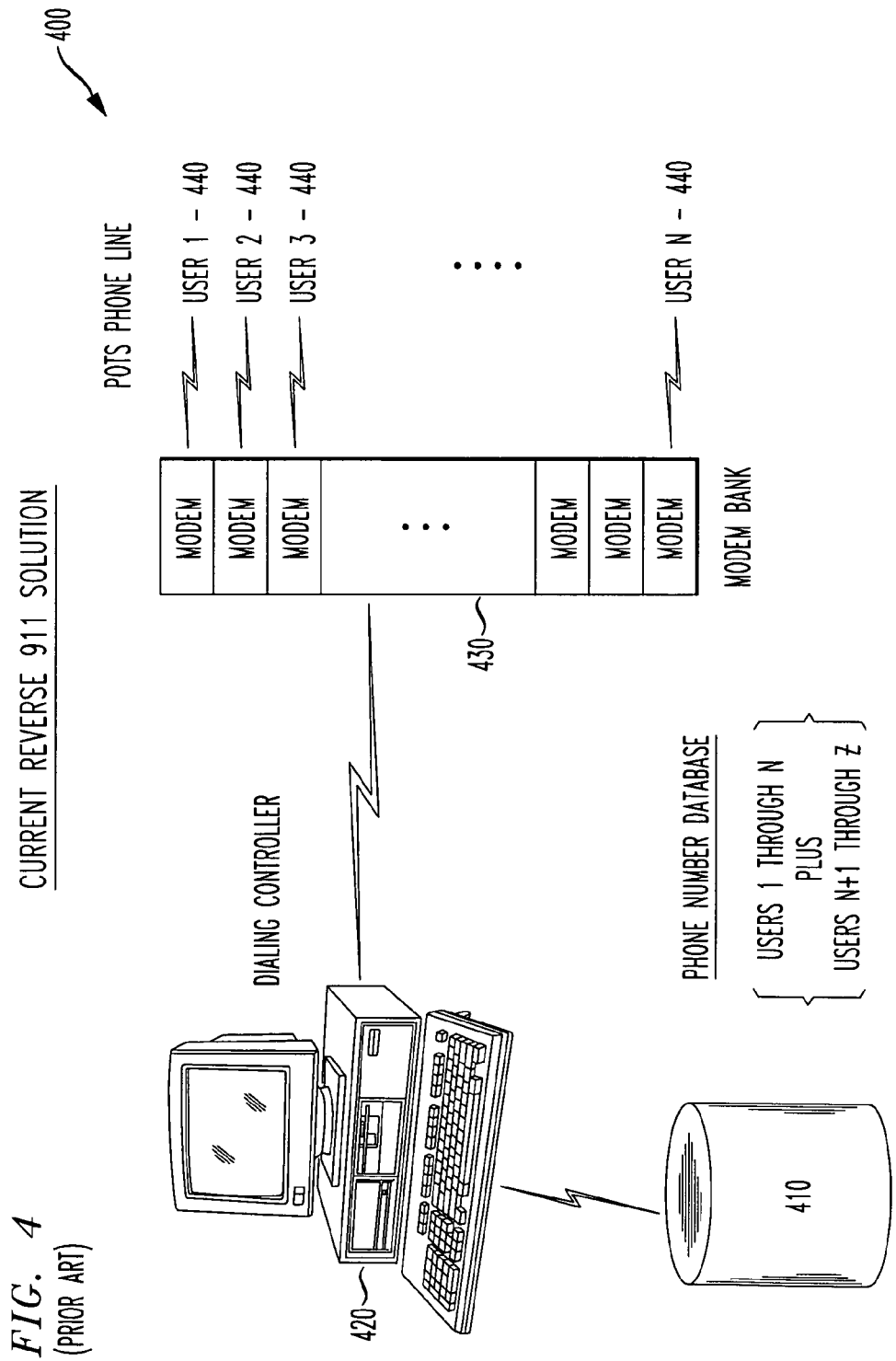
FIG. 4 shows a conventional reverse 911 solution.

FIG. 3 shows a process for initiating a SIP conference based emergency call, in accordance with the principles of the present invention.

In particular, as shown in FIG. 3, a SIP conference based reverse 911 emergency call begins with step 310. In step 310, a trigger event generates a need to communicate an emergency reverse 911 message. Any suitable type of trigger event can generate the emergency reverse 911 communication, e.g., a weather emergency, a terrorist alert, a public announcement such as a school closing, road closure, etc. The SIP conference focus server 102 receives notice of a trigger event.

In step 320, a determination is made as to whether or not a static list of user agents 125 exists. To determine this, the SIP conference focus server 102 searches a user agent database 101 for a static list of user agents 125. If such a static list exists, the process branches to step 330 to begin processing of the user agent list. If such a static list does not exist, the process branches to step 330 to create a dynamic list of user agents 125.

In step 330, criteria for a dynamic list is gathered. To accomplish this, the conference focus server 102 searches user agent database 101 to determine criteria for the dynamic list. The criteria for the dynamic list can include, e.g., a geo-code location of the trigger event and notification boundary, a search list of provisioned subscribers, a search for mobile subscribers, or any additional searches that may be necessary to provide an emergency alert to the user agents 125.

Criteria for the dynamic list can further include, e.g., a method of contacting the user agents 125 (analog voice call, VoIP call, IM, etc.), the time(s) that a particular method of contacting the given user agent 125 may be used, any alternate methods of contacting the given user agent 125, whether the given user agent 125 desires a voice message to be left on an answering machine, the type of user agent 125, (e.g., phone, automobile navigation systems, pagers, TTY devices), etc.

Preferably the user agents 125 can pre-establish their preferences criteria through a variety of means, e.g., through a web site interface, through a voice prompt system, etc.

From the criteria gathered in step 330, a list of user agents 125 is compiled. The conference focus server 102 initiates a database query with the criteria gathered in step 330 as a database search criteria. The database query is passed to a user agent database 101 to retrieve any/all user agents 125 that meet the criteria established in step 320, with the database 101 providing a list of user agents 125 that meet the database search criteria.

In step 340, the user agent 125 list compiled in step 330 is provided to the SIP conference focus server 102 to parse the user agent 125 list and establish a conference bridge 150. Once the SIP conference focus server 102 has determined what user agents 125 to contact, a conference bridge 150 can be established.

The established conference bridge 150 executes SIP call flow with the user agents 125. Specialized user agents 125 can handle SIP INVITE and ACKnowledgements. Specialized user agents 125 can include SMS Gateways, Email Gateways, MMS Servers, SoftSwitch for analog devices, Enterprise VoIP Servers, etc. Call flow can be managed as a proxy server or as a cascading conference, as shown in FIG. 2.

Preferably return communications from the user agents 125 are suppressed so that communication is one way only (TO the user agents 125), with the user agents 125 able to only receive the reverse 911 emergency alert communication.

In an advancement foreseen by the present inventors, two-way reverse 911 communication is a possibility. In such a case, one or more select user agents 125 might be allowed return participation in the SIP conference call to share knowledge concerning an emergency event.

Once communications are established between the conference bridge 150 initiated in step 340 and the relevant user agents 125 designated to receive an emergency call, an emergency message can be delivered to the user agents 125 in step 350. The conference focus server 105 preferably issues an appropriate emergency message to the user agents 125 depending upon the particular type of trigger event and preferably formatted to the specific requirements of the User Agent 125. For example, a Tornado Warning emergency message may be formatted for delivery to a plain old telephone service (POTS) phone as a canned verbal message, e.g., "Tornado Warning". In this example, the same message would also be formatted as text for delivery to a TTY device, as a warning banner or the like for a video enabled mobile phone, and/or as an SMS text message. It is foreseen that the different formats could be delivered simultaneously over the same conference.

The conference focus server 102 may issue either a static (i.e., pre-canned) or a dynamically (i.e., live) emergency alert message to the user agents 125 participating in a given SIP conference (or cascaded SIP conference).

As an example of a static message for a given trigger event to be communicated to all employees within a given company facility, a possible reverse 911 emergency alert message might be, e.g.: "a fire has been detected in the building"; or "Emergency: There is a fire in the building and everyone is to evacuate as quickly and orderly as possible."

As an example of a dynamic message for a given trigger event to be communicated to all users currently on a given stretch of a given highway, an upcoming road closure on that particular interstate may be communicated to user agents currently located within a vicinity of the highway. In such a case, the reverse 911 emergency message might be an announcement of such road closure and possibly include alternate routes to avoid the road closure. Such an emergency message can be dynamic in that it can be changed according to road conditions or other dynamic aspects, e.g., "Interstate 495 is closed in the southbound direction, traffic backups start 3.7 miles south, authorities advise use of interstate 395 as an alternate route."

SIP conference bridge 150 may communicate a reverse 911 emergency alert message including both a static message and a dynamic message to the user agents 125. Alternately, or in conjunction with a text data message, multimedia data (photos, maps, video) can also be delivered to the user agents 125 if the user agent 125 supports receipt of such types of data.

In step 360, the SIP conference focus server 102 issues a termination instruction to user agents 125 instructing them that the SIP conference call is terminated. The SIP conference bridge 150 itself may be disconnected by the SIP conference focus server 102.

The present invention substantially reduces the cost of the an overall solution for implementing reverse 911. Moreover, multiple different types of user agents 125 can be included in the reverse 911 communication beyond just dialing sequences used in typical telephone systems such as IM and email clients, TTY devices, and mobile phones using SMS.

The invention has particular applicability in Public Safety Answering Points (PSAPs), Emergency Preparedness Organizations, Homeland Security and other Government entities involved in public safety and security. It may also be implemented by commercial corporations to notify employees, or by college campuses to notify students.

While the invention has been described with reference to the exemplary embodiments thereof, those skilled in the art will be able to make various modifications to the described embodiments of the invention without departing from the true spirit and scope of the invention.

The invention claimed is:

1. A reverse 911 emergency alert system, comprising:
   a SIP conference focus server to establish a SIP conference triggered by an appropriate reverse 911 trigger event; and
   a Session Internet Protocol (SIP) conference bridge, initiated by said SIP conference focus server, to establish a listen-only SIP conference with said SIP conference focus server as host;
   wherein said SIP conference focus server is adapted to issue a SIP INVITE to each of a plurality of user agent devices designated in a user agent database for listen-only participation in said listen-only SIP conference;
   wherein said SIP conference focus server further establishes at least one other listen-only SIP conference triggered by said appropriate reverse 911 trigger event, and issues a SIP INVITE to each of a said plurality of user agent devices designated in said user agent database for listen-only participation in said listen-only SIP conference or said at least one other listen-only SIP conference;

wherein said SIP conference focus server cascades said listen-only SIP conference with said at least one other listen-only SIP conference until a total of all said plurality of user agent devices designated in said user agent database; and wherein said plurality of user agent devices are provided listen-only access to said SIP conference bridge.

2. The reverse 911 emergency alert system according to claim 1, wherein:

said SIP conference focus server provides an emergency text message through said SIP conference bridge to each of said plurality of user agent devices having listen-only participation in said SIP conference bridge.

3. The reverse 911 emergency alert system according to claim 1, wherein:

said SIP conference focus server provides an emergency voice message through said SIP conference bridge to each of said plurality of user agent devices having listen-only participation in said SIP conference bridge.

4. The reverse 911 emergency alert system according to claim 1, wherein:

said SIP conference focus server provides an emergency digital file through said SIP conference bridge to each of said plurality of user agent devices having listen-only participation in said SIP conference bridge.

5. The reverse 911 emergency alert system according to claim 1, wherein:

said SIP conference focus server provides an emergency video message through said SIP conference bridge to each of said plurality of user agent devices having listen-only participation in said SIP conference bridge.

6. The reverse 911 emergency alert system according to claim 1, wherein:

said SIP conference focus server provides an emergency message by way of a hyperlink to an Internet web page through said SIP conference bridge to each of said plurality of user agent devices having listen-only participation in said SIP conference bridge.

7. The reverse 911 emergency alert system according to claim 1, wherein:

said SIP conference focus server provides an image file through said SIP conference bridge to each of said plurality of user agent devices having listen-only participation in said SIP conference bridge.

8. The reverse 911 emergency alert system according to claim 1, wherein:

said SIP conference focus server provides a static emergency message through said SIP conference bridge to each of said plurality of user agent devices having listen-only participation in said SIP conference bridge.

9. The reverse 911 emergency alert system according to claim 1, wherein:

said SIP conference focus server provides a dynamic emergency message through said SIP conference bridge to each of said plurality of user agent devices having listen-only participation in said SIP conference bridge.

10. The reverse 911 emergency alert system according to claim 1, wherein:

said SIP conference focus server provides a live emergency message through said SIP conference bridge to each of said plurality of user agent devices having listen-only participation in said SIP conference bridge.

11. The reverse 911 emergency alert system according to claim 1, wherein:

at least one of said plurality of user agent devices having listen-only participation in said SIP conference bridge is a Voice over Internet Protocol (VoIP) client.

12. The reverse 911 emergency alert system according to claim 1, wherein:

said plurality of user agent devices receive a reverse 911 emergency message from said SIP conference focus server using any of a plurality of different modes of communication through said SIP conference bridge.

13. The reverse 911 emergency alert system according to claim 1, wherein:

said SIP conference bridge pushes said SIP INVITE to each of said plurality of user agent devices.

14. The reverse 911 emergency alert system according to claim 1, wherein:

said SIP conference focus server initiates limited broadcast capability in said listen-only SIP conference.

15. The reverse 911 emergency alert system according to claim 14, wherein:

said limited broadcast capability is SIP multicast.

16. A method of providing a reverse 911 service, comprising:

receiving a reverse 911 trigger event at a SIP conference focus server;

establishing a Session Internet Protocol (SIP) conference bridge, initiated by said SIP conference focus server, to establish a listen-only SIP conference with said SIP conference focus server as host;

issuing a SIP INVITE to each of a plurality of user agent devices designated in a user agent database for listen-only participation in said listen-only SIP conference, each of said plurality of user agent devices being provided listen-only access to said SIP conference bridge;

establishing at least one other listen-only SIP conference, by said SIP conference focus server also in response to said reverse 911 trigger event;

issuing a SIP INVITE to each of a plurality of user agent devices designated in said user agent database for listen-only participation in said listen-only SIP conference or said at least one other listen-only SIP conference;

wherein said SIP conference focus server cascades said listen-only SIP conference with said at least one other listen-only SIP conference until a total of all said plurality of user agent devices designated in said user agent database are provided listen-only access to said SIP conference bridge; and inputting a reverse 911 emergency message into said SIP conference bridge.

17. The method of providing a reverse 911 service according to claim 16, wherein:

said reverse 911 emergency message is a text message.

18. The method of providing a reverse 911 service according to claim 16, wherein:

said reverse 911 emergency message is a voice message.

19. The method of providing a reverse 911 service according to claim 16, wherein:

said reverse 911 emergency message includes an image.

20. The method of providing a reverse 911 service according to claim 16, wherein:

said reverse 911 emergency message is a video message.

21. The method of providing a reverse 911 service according to claim 16, wherein said reverse 911 emergency message comprises:

a hyperlink to an Internet web page.

22. The method of providing a reverse 911 service according to claim 16, wherein:

said reverse 911 emergency message is live.

23. The method of providing a reverse 911 service according to claim 16, wherein:
   at least one of said plurality of user agent devices is a Voice over Internet Protocol (VoIP) client.

24. The method of providing a reverse 911 service according to claim 16, wherein:
   said plurality of user agent devices receive said reverse 911 emergency message from said SIP conference focus server using any of a plurality of different modes of communication through said SIP conference.

* * * * *